No. 888,054. PATENTED MAY 19, 1908.
A. ASCHENBRENNER.
DOUBLE WALLED VESSEL.
APPLICATION FILED OCT. 18, 1907.

Witnesses:-
F. George Barry,
Henry Theine.

Inventor:
Albert Aschenbrenner
by attorneys

UNITED STATES PATENT OFFICE.

ALBERT ASCHENBRENNER, OF BERLIN, GERMANY, ASSIGNOR TO AMERICAN THERMOS BOTTLE COMPANY, OF BROOKLYN, NEW YORK, A CORPORATION OF MAINE.

DOUBLE-WALLED VESSEL.

No. 888,054.  Specification of Letters Patent.  Patented May 19, 1908.

Application filed October 18, 1907. Serial No. 398,050.

*To all whom it may concern:*

Be it known that I, ALBERT ASCHENBRENNER, manufacturer, residing at No. 8 Chausseestrasse, Berlin, Germany, a subject of the King of Prussia, German Empire, have invented new and useful Improvements in Double-Walled Vessels, of which the following is a full, clear, and exact specification.

My invention relates to a double-walled vessel made of glass and intended for the transport of food and drinks, which have to retain their original temperature as long as possible. The existing vessels of this kind are provided with stiffening pieces situated between the walls and kept in position by wire baskets, rings or the like. According to my invention such stiffening pieces are kept in position by the silver coating provided on the inside of the outer wall and on the outside of the inner wall. This silver coating closely fits around the stiffening pieces, which are in contact with said inner and outer walls, so that pockets are formed in the silver coating, in which the stiffening pieces are placed and tightly fit.

Figure 1:
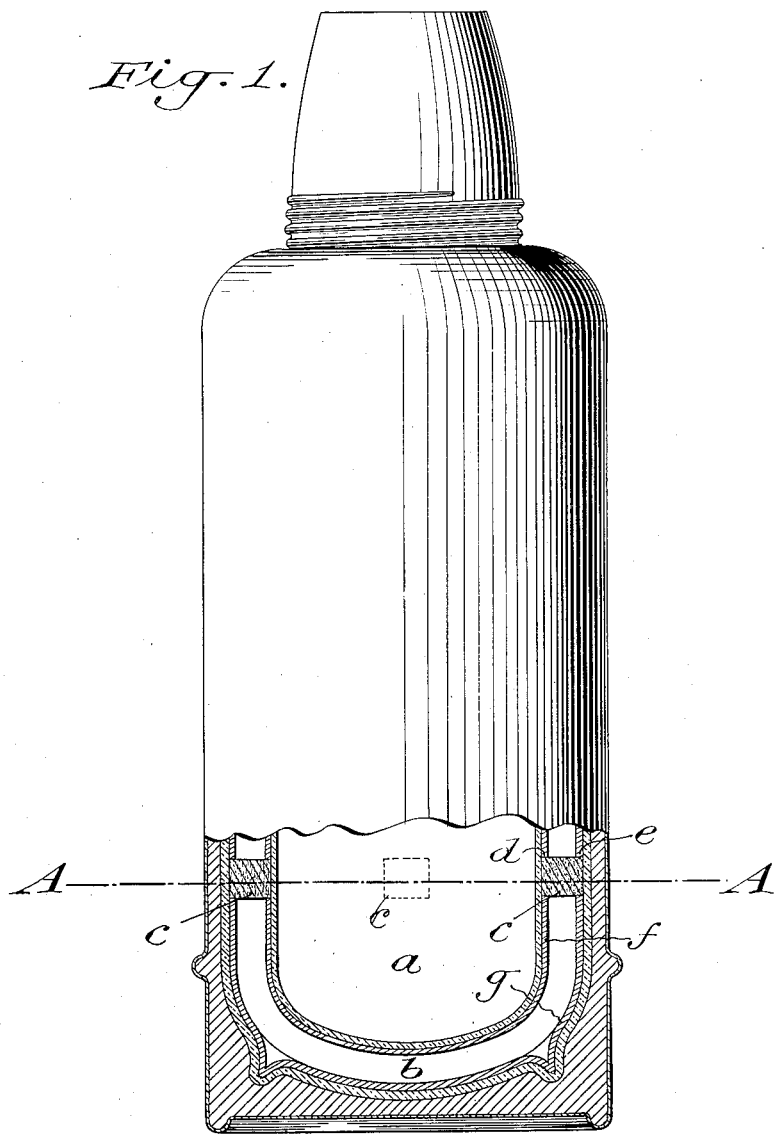
Figure 2:
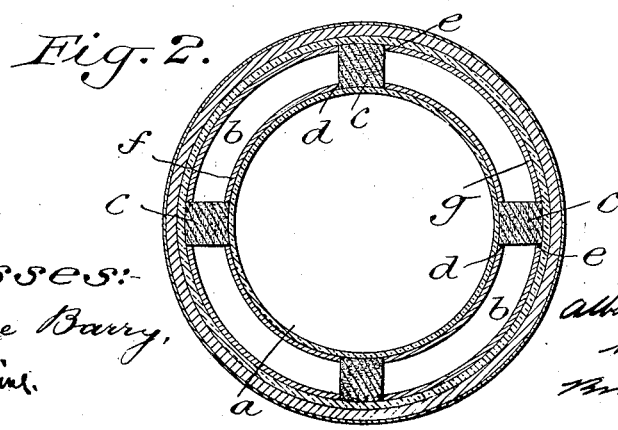

In the accompanying drawing, Figure 1 shows a vacuum insulated double-walled vessel, partly in side elevation and partly in vertical central section, with my invention applied thereto, and Fig. 2 is a horizontal section taken in the plane of the line A—A of Fig. 1.

The double-walled vessel is denoted by $a$ and it incloses a vacuum space $b$ between its inner and outer walls. Stiffening pieces $c$ are interposed between the outer and inner walls for reinforcing them. Said stiffening pieces are situated in pockets $d$, $e$ in the silver coating $f$, $g$, on the outside of the inner wall and on the inside of the outer wall respectively, and are thus supported in position by the said silver coating. The silver coating snugly embraces the stiffening pieces so that they are prevented from being displaced by vibrations or other external influences.

What I claim is:

1. In combination with a double-walled vessel having a vacuum space between its inner and outer walls, of stiffening pieces interposed between the inner and outer walls, and a silver coating having pockets therein for receiving and supporting the stiffening pieces.

2. In combination with a double-walled vessel having a vacuum space between its inner and outer walls, of stiffening pieces interposed between the inner and outer walls, and a silver coating on the outside of the inner wall and the inside of the outer wall respectively, said coating having pockets therein for receiving and supporting the said stiffening pieces.

In witness whereof I have hereunto set my hand in presence of two witnesses.

ALBERT ASCHENBRENNER.

Witnesses:
FRANZ SCHWENTERLEY,
HENRY HASPER.